(12) United States Patent  (10) Patent No.: US 11,702,809 B2
Hanscom  (45) Date of Patent: Jul. 18, 2023

(54) TIDAL CREATOR FOR A TERMINAL LAKE AND METHOD OF USING THE SAME FOR RESTORATION EFFORTS AT THE SALTON SEA

(71) Applicant: Eric Hanscom, Carlsbad, CA (US)

(72) Inventor: Eric Hanscom, Carlsbad, CA (US)

( * ) Notice: Subject to any disclaimer, the term of this patent is extended or adjusted under 35 U.S.C. 154(b) by 210 days.

(21) Appl. No.: 17/334,294

(22) Filed: May 28, 2021

(65) Prior Publication Data

US 2021/0388566 A1 Dec. 16, 2021

Related U.S. Application Data

(60) Provisional application No. 63/037,188, filed on Jun. 10, 2020.

(51) Int. Cl.
*E02B 3/00* (2006.01)
*A01G 22/00* (2018.01)

(52) U.S. Cl.
CPC ............... *E02B 3/00* (2013.01); *A01G 22/00* (2018.02)

(58) Field of Classification Search
CPC combination set(s) only.
See application file for complete search history.

(56) References Cited

U.S. PATENT DOCUMENTS 5,322,035 A * 6/1994 Hawes ................ A01K 63/003
119/211
7,832,959 B1 * 11/2010 Groen ...................... E02B 3/00
405/74

FOREIGN PATENT DOCUMENTS

JP H0861244 A * 3/1996

* cited by examiner

*Primary Examiner* — Kyle Armstrong
(74) *Attorney, Agent, or Firm* — Eric Hanscom

(57) ABSTRACT

This invention is a device for creating tidal action in a terminal lake. A first aspect involves staggering of input and output from the terminal lake, such that the level of the lake rises and falls on a daily basis to simulate tidal action. A second aspect involves the creation of a berm and islands, with a system of pumps and drains filling and emptying a series of holding ponds, creating an even greater "reach" of the tidal action. This tidal action allows for the growth of mangrove forests, which prevent land-based predators such as coyotes from accessing bird nests on the islands, as well as keeping the "playa" wet enough so that local wind does not pick up playa sediment and create toxic dust storms. The toxic upper 3" of the "playa" is bulldozed to create the berm, islands, and access roads which bisect the newly-created intertidal zone.

17 Claims, 11 Drawing Sheets

TIDAL CREATOR FOR A TERMINAL LAKE AND METHOD OF USING THE SAME FOR RESTORATION EFFORTS AT THE SALTON SEA

CROSS REFERENCE TO RELATED APPLICATIONS

This application claims priority back to U.S. Provisional No. 63/037,188, filed Jun. 10, 2020, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the invention: This invention relates to the general field of creating artificial tides in landlocked lakes, and more specifically, to a device by which tidal fluctuations can be created in the Salton Sea enhancing aeration, decreasing salinity, and providing mangrove habitat.

Brief Description of Invention. The Salton Sea is a saltwater lake the lies in the desert about 2½ hours east of San Diego, Calif. Because the Salton Sea has no outlet, it has become saltier and saltier over the years, to the point where it currently 1½ times the salinity of ocean water. While 40 years ago, the Salton Sea with a thriving region with sportfishing and other aquatic activities, the sport fish cannot tolerate the high salinity and have died out. In addition, poor water circulation causes occasional algal blooms that take up so much oxygen that much of the aquatic life remaining in the Salton Sea dies and floats to the surface, causing a county-wide stench. As the fish die off, so does the food source for over 400 species of birds that feed in the Salton Sea either full time or during migration stopovers.

Due to political and economic issues, the Salton Sea has been drying up, as less and less water is diverted into it. As the Salton Sea dries up, not only is the salinity increased at an alarming rate, but also more and more of the "playa" (the lakebed) is left exposed as the Sea recedes. This presents an immediate danger, as the lakebed contains the pesticide and fertilizer runoff from the last 100 years, and when these toxins become airborne, all life within the reach of these toxic clouds breathes in polluted air. This situation has become so serious that school children living in close proximity to the Salton Sea experience over three times the national average of asthma many and other breathing-related illnesses.

Thus, it has become clear for many years that two things have to be done to the Salton Sea. First, the salinity needs to be brought back to a level that will support fish and other aquatic life. Second, the level of the Salton Sea has to be restored such that there is less exposed playa.

Many theories have been put across to "save" the Salton Sea, including seawater import ("Sea to Sea"), dividing the Sea into a "good" portion and a "bad" portion, and trying to find an additional source of fresh water. With Southern California continuing to grow, taking fresh water away from the cities is not likely to be politically possible. At the same time, the idea of concentrating toxins into a "bad" section of the Salton Sea is not a long-term alternative in the minds of many people involved in the Salton Sea. The alternative of just doing nothing is not feasible, as at the current rate of shoreline recession, thousands of acres of playa are being exposed every year and toxic dust clouds will become more toxic as more playa is exposed.

Many experts agree that importing seawater is the best way to at least prevent the water level of the Salton Sea from decreasing further. Proposals have been made to import seawater through Mexico from the Sea of Cortez, over the Cuyamaca Mountains from San Diego County, or around Mt. San Jacinto from Los Angeles through Palm Springs. While these proposals could cover up the playa, they do not solve the problem of the Salton Sea's growing salinity, as the Salton Sea would continue to lose freshwater through evaporation.

Another proposal has been to bring two pipelines in from the Sea of Cortez: one pipeline that pumps saltwater into the Salton Sea and other pipeline that pumps water back from the Salton Sea to the Sea of Cortez. This proposal, however, relies on a number of open canals that would further concentrate the salinity of the water dumped into the Salton Sea, and these proposals do not deal with cleaning up the water or establishing any kind of vegetation that would survive in salty water, promote wildlife habitat, and help to purify the water.

Mangrove trees have been suggested by a number of people as an ideal tree to help "fix" the Salton Sea. Mangroves are excellent carbon sinks and can survive in salty water. Their extensive, branching root system provides ideal cover for young fishes and invertebrates and mangroves can actually help to purify water by removing toxins through their roots. The reason mangroves do not work in the Salton Sea is that mangroves require tidal action to cover and uncover their roots. In their native habitats, mangroves are exposed to tidal variations ranging from several to ten or so feet, with two high tides and two low tides each day. Enclosed bodies of water such as the Salton Sea have minute tidal action of less than an inch per day—not nearly enough to "flush out" any mangrove swamp.

The invention takes the existing ideas of canals and pipelines bring sea water to the Salton Sea and combines it with a staggered inflow and outflow such tides would be created, thereby creating ideal mangrove habitat. Because the Salton Sea has such a gently sloped bottom, a tidal range of just two feet would cover and uncover, on a daily basis, huge stretches of playa, and, when combined with several species of mangroves, would create an ideal fishery. A second part of this invention suggests the use of berms at the current water level of the Salton Sea which are filled, and emptied every day, providing mangrove habitat and keep the surface of the playa wet so that toxic dust is not picked up by the wind. This second part of the invention would basically double the amount of area that would be suitable for mangrove forests.

The inflow into the Salton Sea and the outflow out of it would be controlled by pumping stations synchronized to coordinate pumping schedules to create the desired tidal action. Inflow could be from the Sea of Cortez, around Mt. San Jacinto from Los Angeles via Palm Springs, or over (or through) the Cuyamaca Mountains east of San Diego. It is contemplated that there could be a holding lake located at the peak of the water's journey such that it could be stored in the lake and released when a "high tide" was desired.

While the "new" water was flowing into the Salton Sea, "output" pump stations would be ready at the other end of the Salton Sea to pump out seawater when a "low tide" was desired. The location of the "input" and "output" would ensure that the Salton Sea was mixed well. Once the Salton Sea had filled to "high tide", a timer would trigger the output pumps to gradually remove some water to create a "low tide". Since the "output" would be staggered to allow for the desired tidal action, an open river that ran downhill, after reaching a crest in the water's journey from the Salton Sea to its eventual sink, to either the Colorado River to Sea of Cortez could be lined with mangroves that would, again, be able to grow because of the tidal fluctuation in the outlet river.

To assist with aeration of the Salton Sea, the input water would be delivered from one or more input pipes located several feet above the Salton Sea. As the input pipes release water, the water would enter the Salton Sea, causing turbulence and a constant source of aeration. It is contemplated that an entire series of small input pipes could be suspended over numerous locations at the input end of the Salton Sea, thereby enhancing aeration of a larger area of the Salton Sea.

On a daily basis, solar-powered pumps on top of the berm will pump water out of the Salton Sea and into holding ponds established "uphill" behind the berm. As water is pumped out of the Salton Sea to fill these holding ponds, the level of the Salton Sea will fall, allowing to mangroves to grow in a "tideland" located downhill from the berm as well, on areas that are uncovered when the water that previously covering the tidelands is pumped into the holding bays. When the desired tidal cycle calls for a low tide in the holding bays and a high tide in the Salton Sea, drains through the berm are opened and water from the holding bays flows back into the Salton Sea, leaving the holding bays dry and refilling the Salton Sea so that it reaches the bottom of the berm.

OBJECTS OF THE INVENTION

It is therefore an object of the present invention to provide a source of water to maintain the Salton Sea's level.

An additional object of the invention includes creating tidal action in the Salton Sea through both staggered inflows and outflows, and through creation of a berm and holding ponds that can be sequentially filled and drained to simulate tides.

A further object of the invention is to provide a habitat suitable for mangroves in the Salton Sea.

Another object of the invention is to provide secure and safe nesting areas in the Salton Sea for a variety of bird species.

A further object of the invention is to expand the amount of the playa that is "wetted down" from time to time to first, keep dust at a minimum, and second, to create a muddy barrier to bird nests that is impenetrable to coyotes and other land animals.

A further object of the invention is to enhance recreational activities in the Salton Sea including but not limited to boat marinas, offshore restaurants and civic buildings, offshore visitor centers, offshore camping, hiking and walking areas.

Another object of the invention is to divide part of the intertidal zone into separate holding ponds which could be subjected to a variety of different salinities and biological components, thereby allowing scientists to experiment on better ways to reclaim playa and other attributes of terminal lakes.

A final object of the invention is to enhance aeration, lower salinity, and clean up the water of the Salton Sea.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Figure 1:
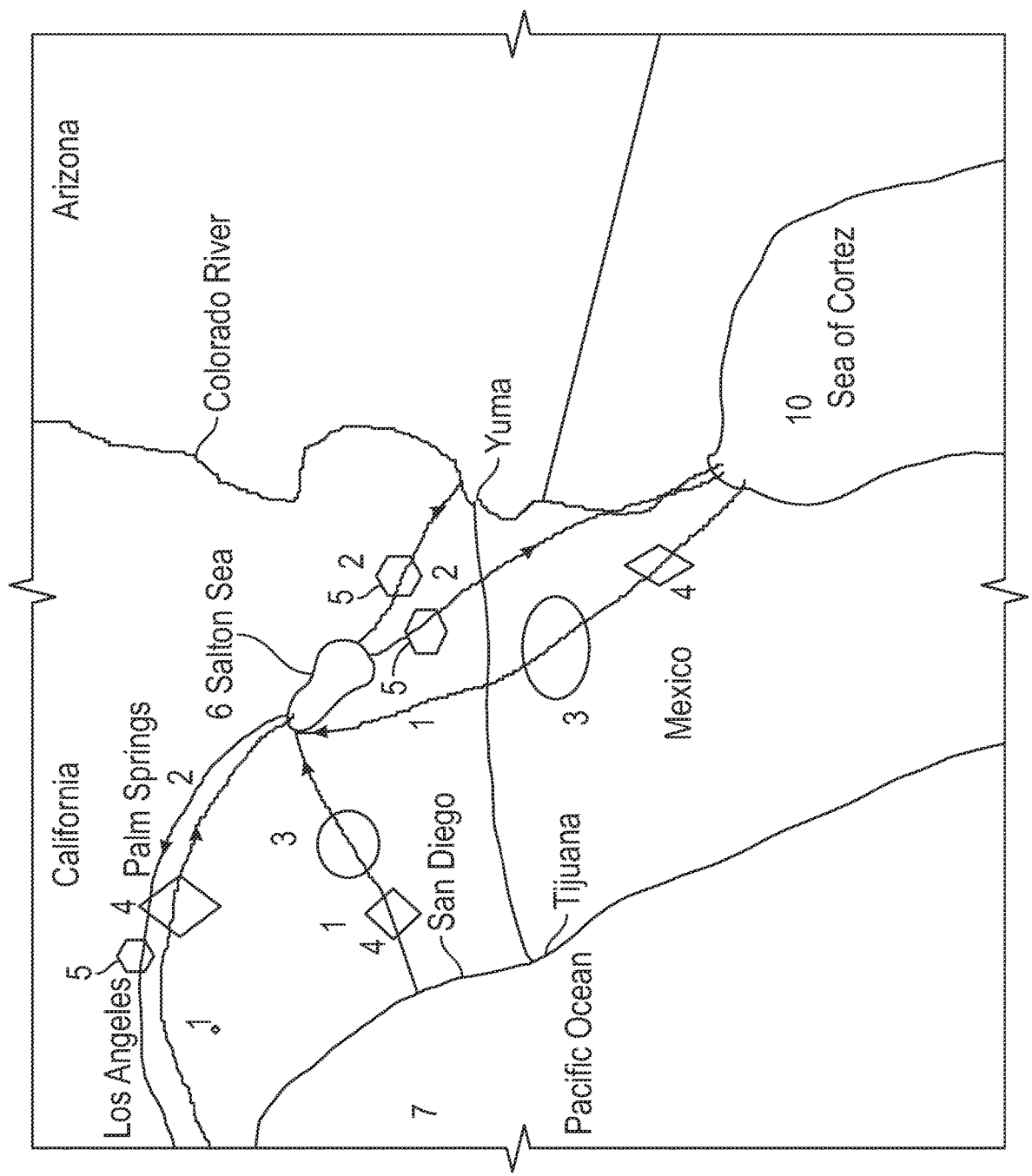
FIG. 1 is top view of the Salton Sea region showing a preferred embodiment of where various parts of the invention would be located.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 1 is top view of the Salton Sea region showing a preferred embodiment of where various parts of the invention would be located. This view show three possible source in input 1 water: the Sea of Cortez 10, or from the Pacific Ocean 7, over the Cuyamaca Mountains east of San Diego or from Los Angeles through Palm Springs. Any one of the three inputs 1, or a combination of any of the three, could supply seawater to the Salton Sea 6. Outputs 2 would remove water from the Salton Sea 6 and send it into the Colorado River 9 above the border with Mexico, or in a parallel path next to any of the input 1 flows. For input 1 flows, input pump stations 4 would, at desired times, pump seawater either directly into the Salton Sea 6, or into intermediate lakes 3, which would hold the seawater until a "high tide" was desired in the Salton Sea, at which point an input secondary pump station 8, would either pump, or just release the seawater, and the let gravity take it into the Salton Sea. When a "low tide" was desired, the input pump stations 4 and input secondary pump stations 8 would shut off, so no further water was delivered to the Salton Sea, and output pump stations 5 would begin to remove water from the Salton Sea. No matter what the output path was, because the output pump stations would only release water from the Salton Sea periodically, the same "tides" that allowed mangroves to live in the Salton Sea (and help to clean up the water) would like in the river channels through which the saltwater would flow once or twice a day.

Figure 2:
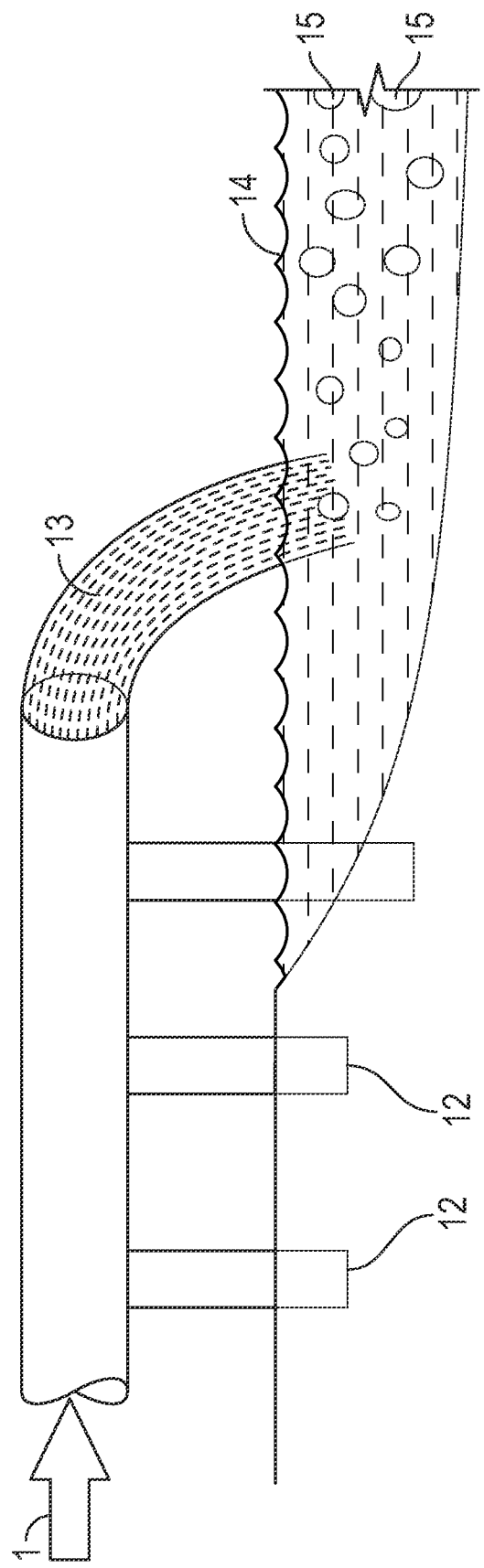
FIG. 2 is a side view of an input pipe dumping water into the Salton Sea and enhancing aeration.

FIG. 2 is a side view of an input pipe dumping water into the Salton Sea and enhancing aeration. The input 1 water would flow in direction 11 from either an input dump station or an input secondary pump station. Elevated supports 12 would cause the plume 13 to be released well above the level 14 of the Salton Sea. As the plume 13 entered the Salton Sea, aeration 15 would be accomplished.

Figure 3:
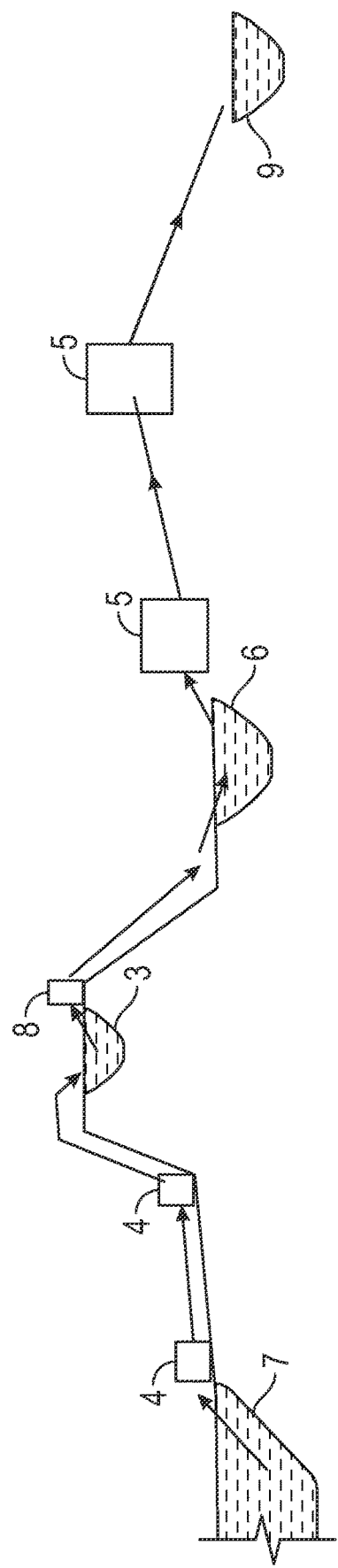
FIG. 3 is side view of a preferred embodiment of the invention utilizing holding lakes as part the input of water into the Salton Sea.

FIG. 3 is side view of a preferred embodiment of the invention utilizing holding lakes as part the input of water into the Salton Sea. The basic concept is that seawater is brought up to the summit, such that once it is released, gravity will deliver it to the Salton Sea. Water is taken from the ocean through in input 1, caused by an input pump station 4. It is contemplated the input 1 will be through a pipeline. Input pump station 4 pumps the input 1 water up to an intermediate lake 3, which stores the seawater. An input secondary pump station 8 is triggered to deliver the water to the Salton Sea when a "high tide" is desired. The input secondary pump station 8 is preferably located near the eastern edge of the summit, such that once the input secondary pump station 8 is triggered to release water, it has a minimum amount of pumping to do and the water flows naturally downhill to fill the Salton Sea. When a "low tide" is desired, the input pump stations 4 and input secondary pump stations 8 stop pumping, and the output pump stations 5 begin removing water from the Salton Sea. Once this output 2 water reaches the summit on its path back to the Pacific Ocean or Sea of Cortez, the output 2 water will be allowed to flow via gravity down a watercourse. Because this watercourse will be, on a daily basis, covered by seawater and then uncovered, mangrove trees will thrive in the watercourse, providing habitat and removing pollutants from the output 2 seawater.

Figure 4:
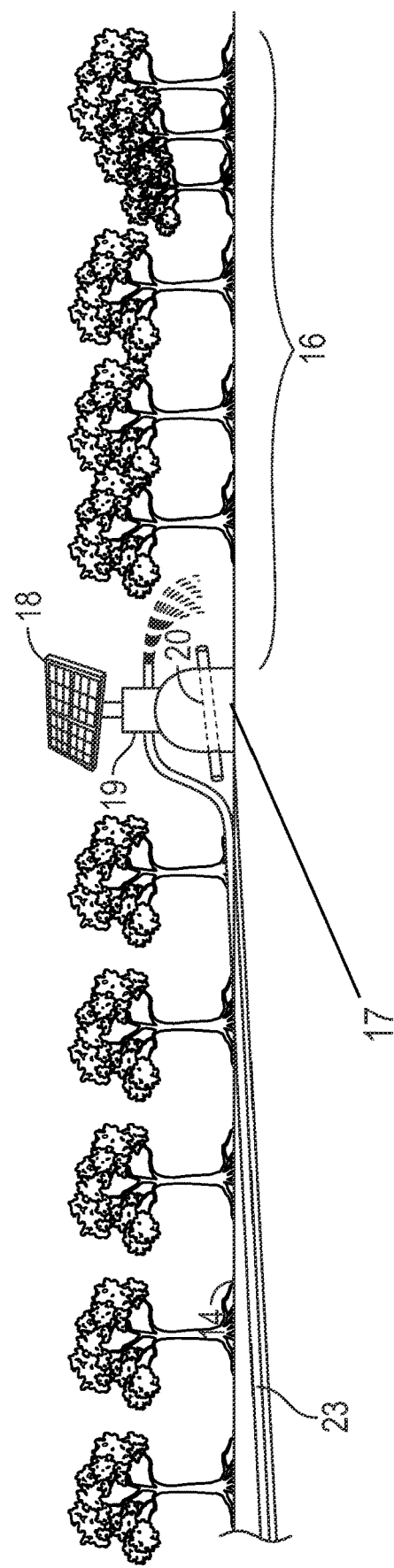
FIG. 4 is a side view of the "holding pond" embodiment of the invention showing the current status of the Salton Sea, with a long section of exposed "playa".

FIG. 4 is a side view of the "holding pond" embodiment of the invention showing the current status of the Salton Sea, with a long section of exposed "playa" 16 above the current level 14 of the Salton Sea. For over 100 years, agriculture runoff, including significant amounts of fertilizer and pesticides, has been dumping into the Salton Sea. Because it is terminal lake, the Salton Sea does not "flush out" these toxins, but rather, they accumulate on the lakebed. As the level of the Salton Sea recedes, more playa 16 is exposed and dries out. When the frequent wind storms pass through the region, they pick up toxic particles from the playa and create a toxic dust cloud that passes over a number of cities near the Salton Sea, resulting in a child asthma rate that is over three times the national average. The playa 16 is almost completely devoid of plant life, as there is only around 6" of rain a year and the playa is exposed in the summer to temperatures upwards of 115 degrees.

A programmable computer is set to create artificial tides along a transect of the shoreline. The berm 17 is built at or around the current level of the Salton Sea. There is a solar panel 18 the powers a pump 19. The pump 19 has a pipeline 23 that extends to the deeper water of the Salton Sea. Through the berm 17 is a drain 20, that has a flap that can open or close, also controlled by the programmable computer. Water is moved from above the tideland (that area in this figure to the left of the berm) to above the playa 16, in a sequence that mimics the tides. Because both the tidelands and the playa 16 now have tidal action, mangroves 21 and other tidal-dependent plant species can now grow over both areas. The shade provided by the mangrove leaves and branches decreases evaporation, and the roots provide support to the soil in addition to removing toxins from the water.

Viewing this figure, one can see that a "high tide" at the Salton Sea corresponds to a "low tide" in the holding ponds. The tidelands (that area in this figure to the left of the berm) are covered with water and the playa is exposed to the air. When the pump 19 becomes operational (at daylight), water from the Salton Sea is pumped into the holding ponds and the playa 16 is now covered with water. The water to cover the playa came from the Salton Sea, so the Salton Sea level has receded to expose the tidelands. When the programmable computer dictates that the Salton Sea "high tide" sequence should begin, the pump stops working that the drain 20 opens, thereby allowing the water that created a high tide in over the playa to flow back into the Salton Sea, creating a high tide over the tidelands.

Thus, the invention restores the playa by periodically covering and uncovering it, and creates the tidelands, thereby doubling the amount of the Salton Sea in which mangrove trees can grow.

Figure 5:
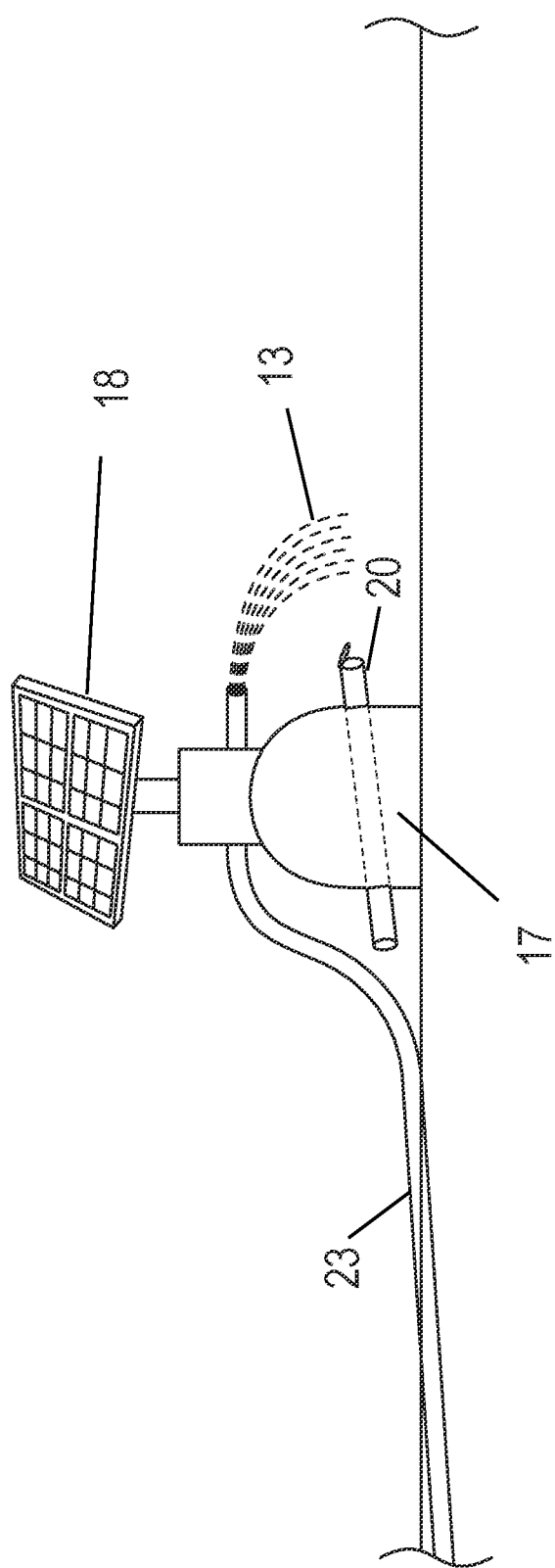
FIG. 5 is a side view of the berm, pump and drain mechanisms in a "holding pond" embodiment of the invention showing berm with a solar-powered pump station situated on top of the berm, with a pipeline into a deeper portion of the Salton Sea, and a controlled-release drain.

FIG. 5 is a side view of the "holding pond" embodiment of the invention, show the creation of a berm 17 by bulldozing the upper 3" or so of the playa (the most toxic part). Various governmental agencies are currently digging furrows in the playa, with limited success in preventing dust storms, so it would be fairly easy to divert the furrowing activities into pushing the upper 3" or so of playa into a berm 17. The solar panel 18 powers the pump during daytime, pumping water from the Salton Sea through the pipeline 23, creating a plume 13 into the holding pond. At a desired time (such as when the sun goes down), the pump is stopped and the drain 20 is opened, thereby draining the water in the holding pond back into the Salton Sea.

Figure 6:
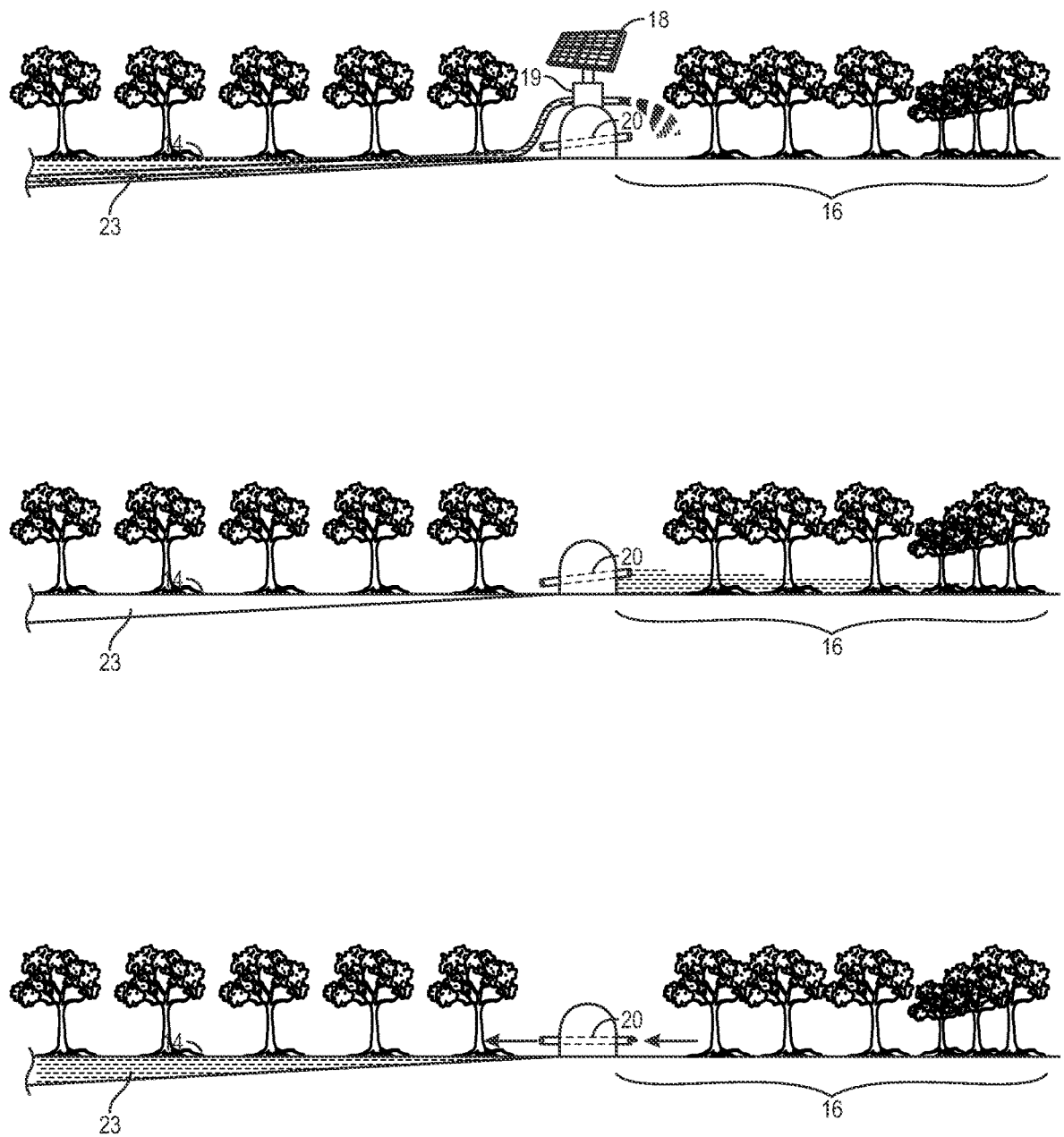
FIG. 6 is a side view of the "holding pond" embodiment of the invention showing how even a fairly short berm will extend an artificial intertidal zone above the playa. The playa is covered by a thin sheet of water after the pump has taken water from the Salton Sea, exposing a tideland portion of the Salton Sea. This figure also shows the possible range for mangrove trees, which require periodic covering and uncovering by tidal action to survive.

FIG. 6 is a side view of the "holding pond" embodiment of the invention showing how even a fairly short berm 17 will extend above the playa 16. Because the Salton Sea has such a gradual slope, even a berm of a couple of feet could translate into a body of water whose surface covers the entire playa 16. During the daytime, the solar panel 18 powers the pump 19 to bring water from the "Sea" side to the "Playa" side. This creates an intertidal zone on the Sea side of the berm as that area is exposed as water is moved "uphill" to the playa side of the berm, and a second intertidal area on the uphill side of the berm as the playa is covered with water. At night, the solar-powered pump stops working, and the drain 20 is opened by the computer control in the pump unit to allow the water to flow back to the Sea side of the berm. This artificially-created intertidal zone will allow mangroves to grow on both sides of the berm. The mangroves will accomplish several goals. First, mangroves are an excellent sink for carbon dioxide, thereby helping reverse the global warming trend. Second, by shading the underlying soil from the sun, the mangroves limit evaporation, such that the soil stays wet. This helps to minimize toxic dust that is picked up during windy days. Third, because a mangrove forest has nearly impenetrable root systems, birds can safely nest in the trees without have to worry about being attacked by coyotes and other land animals.

In this "holding pond" embodiment of the invention showing berm with a solar-powered 18 pump station 19 situated on top of the berm, with a pipeline 23 into a deeper portion of the Salton Sea, and a controlled-release drain 20. A computer times the operation of the inlet pump 19 and the release of water through the drain 20, such that a temporary "high tide" can be created to cover the entire playa 16. Water is taking from deep in the Salton Sea through a long pipeline 23, thereby enhancing water circulation within the Salton Sea.

A solar panel 18 powers a pump 19 that brings deep water from the Salton Sea and dumps in into the bay or "holding pond" created by the berm. As the water plume is discharged several feet above the bay, aeration will be accomplished as the plume splashes down. The computer adjusts how much water will be pumped into the bay by adjusting the volume of water brought through the pump for how for long the pump will run, and how long the bay will remain full, at a "high tide" status. When a "low tide" is desired, the computer will shut off the pump 19 and will open the drain 20, thereby draining the bay. This will create a tidal flow in the bay, above the playa, that will support mangrove trees.

As water is pumped from the Salton Sea into the bay, the level of the Salton Sea recedes further, exposing a new, tideland section on the Salton Sea side of the berm (to the left of the berm in this figure). Because this part of the Salton Sea will also have tidal flushing, mangrove trees can grow in this section of the Salton Sea as well. Again, because the Salton Sea has a very gradual slope, the extent of the tidelands will be very extensive, allowing for another large area of mangrove forest. After the input has stopped and the water that previously overlaid the playa has been allowed to flow back into the Salton Sea, the playa 16 is now exposed, giving the mangrove trees the tidal flushing they need to survive and flooding the tidelands on the other side of the berm, giving the mangroves on that side of the berm to periodic flooding that they need.

Figure 7:
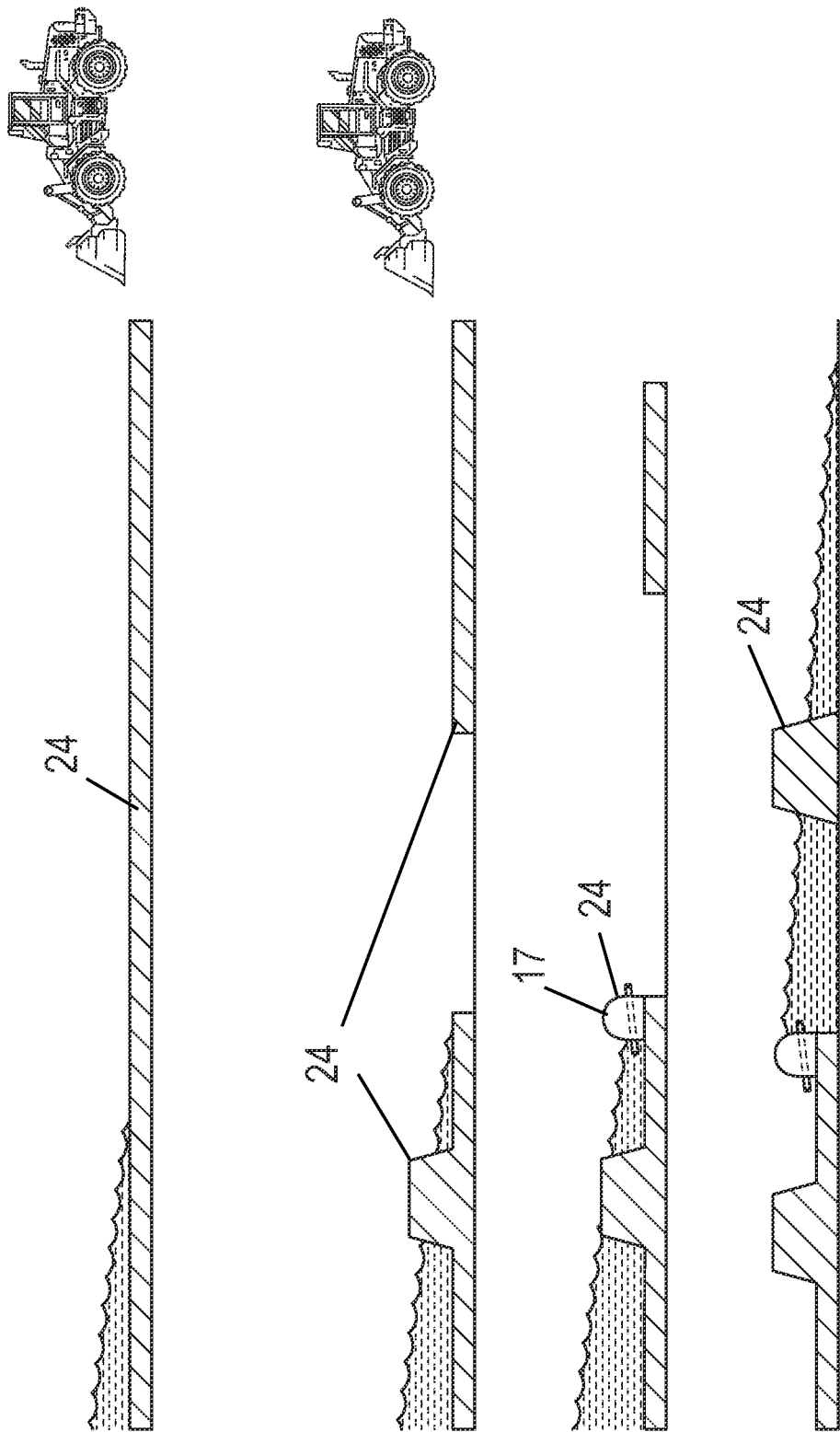
FIG. 7 is a cross-sectional view of how the islands and berms are created in the "holding pond" embodiment of the invention, showing the creation of a berm and islands by bulldozing the upper 3" or so of the playa (the most toxic part).

FIG. 7 is a cross-sectional view of how the islands and berms are created in the "holding pond" embodiment of the invention, showing the creation of a berm 17 and islands by bulldozing the upper 3" or so of the playa 24 (the most toxic part). The current method of treatment is for a bulldozer to tow a furrowing machine, which creates furrows in the soil. In theory, this method helps to "bury" some of the toxic upper crust of the playa, but in reality, the toxins are still exposed to the wind. In addition, the furrows provide physical obstacles to a number of bird species that nest on the playa. To solve this problem, the same bulldozers that are currently making furrows, would set their blade depths to 2" to 3", and scoop up the toxic upper crust of the playa, forming it into islands and the berm. This will concentrate the toxins in easily seen locations and allow for them to be covered up with plastic or even cement. By removing the toxic upper layer, mangrove growth will be encouraged once the holding ponds are flooded and drained every day to simulate tides.

Figure 8:
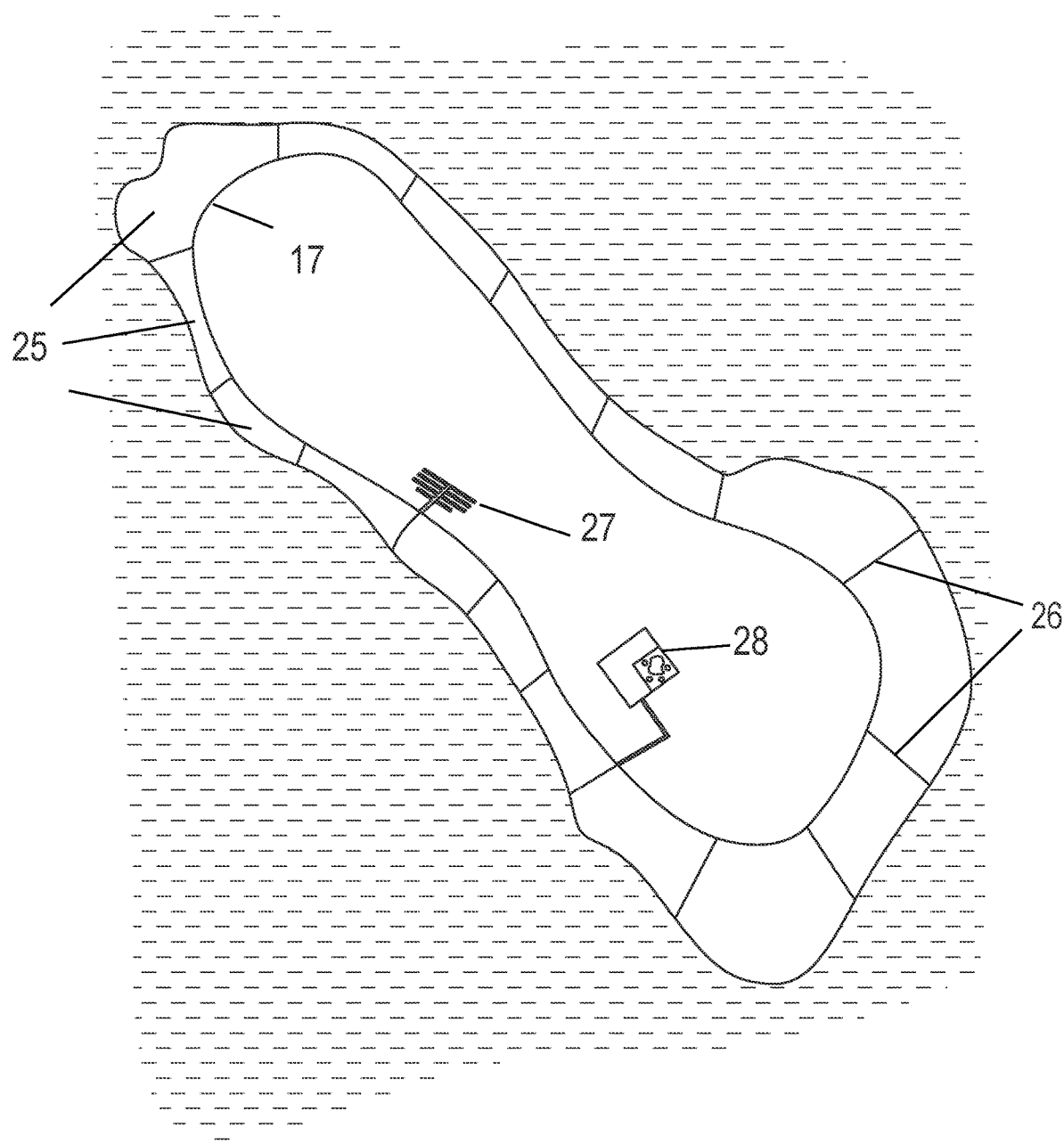
FIG. 8 is a top view of the Salton Sea showing how the berm would separate the Salton Sea into two distinct regions, and how a system of roads and access paths from the land to the berm could create a number of holding ponds.

FIG. 8 is a top view of the Salton Sea showing how the berm would separate the Salton Sea into two distinct regions separated by the berm 17, and how a system of roads and access paths 26 from the land to the berm could create a number of holding ponds 25. Different holding ponds could be flooded/drained under different treatment regimens, and some even used for experimental purposes. The access roads could be made wide enough, and extend out into the Salton Sea, to link with marinas 27, ecolodges 28, and other tourist attractions.

Figure 9:
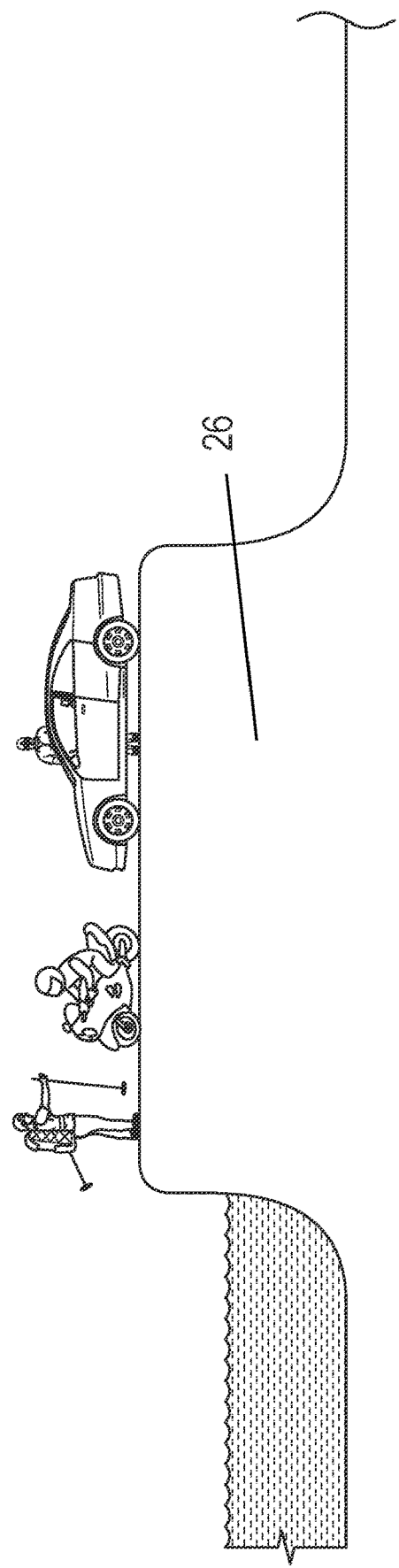
FIG. 9 is a cross-sectional view of one embodiment of the berm, in which a large berm was constructed that could accommodate hikers, bike riders, and even cars/maintenance vehicles.

FIG. 9 is a cross-sectional view of one embodiment of the berm, in which a large berm 26 was constructed that could accommodate hikers, bike riders, and even cars/maintenance vehicles.

Figure 10:
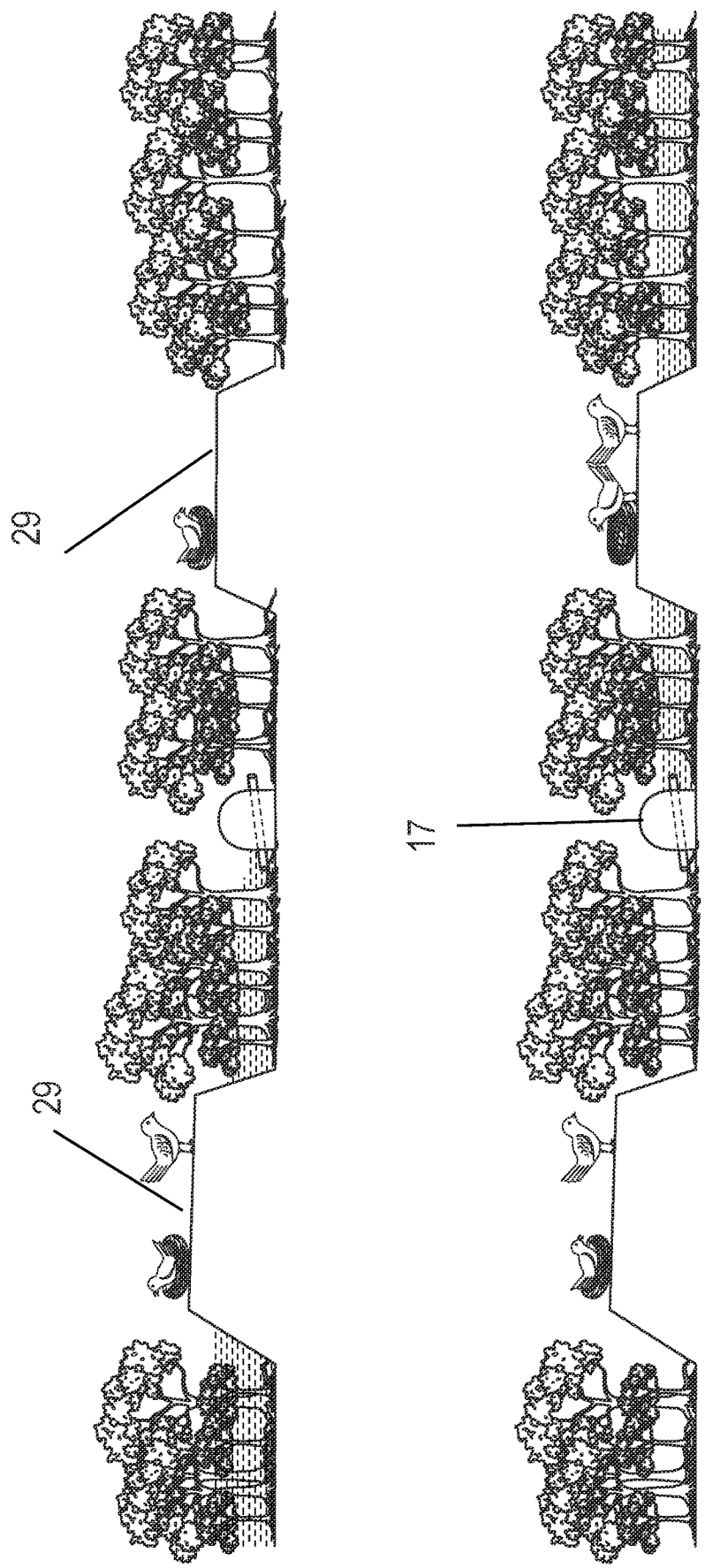
FIG. 10 is a side view of the berm showing how the pump and drain are controlled to either bring in water or release water to simulate tidal action, showing how the intertidal nature of the invention allows mangrove habitat to protect nesting areas for birds on both sides of the berm.

FIG. 10 is a side view of the berm showing how the pump and drain are controlled to either bring in water or release water to simulate tidal action, showing how the intertidal nature of the invention allows mangrove habitat to protect nesting islands 29 for birds on both sides of the berm 17.

Figure 11:
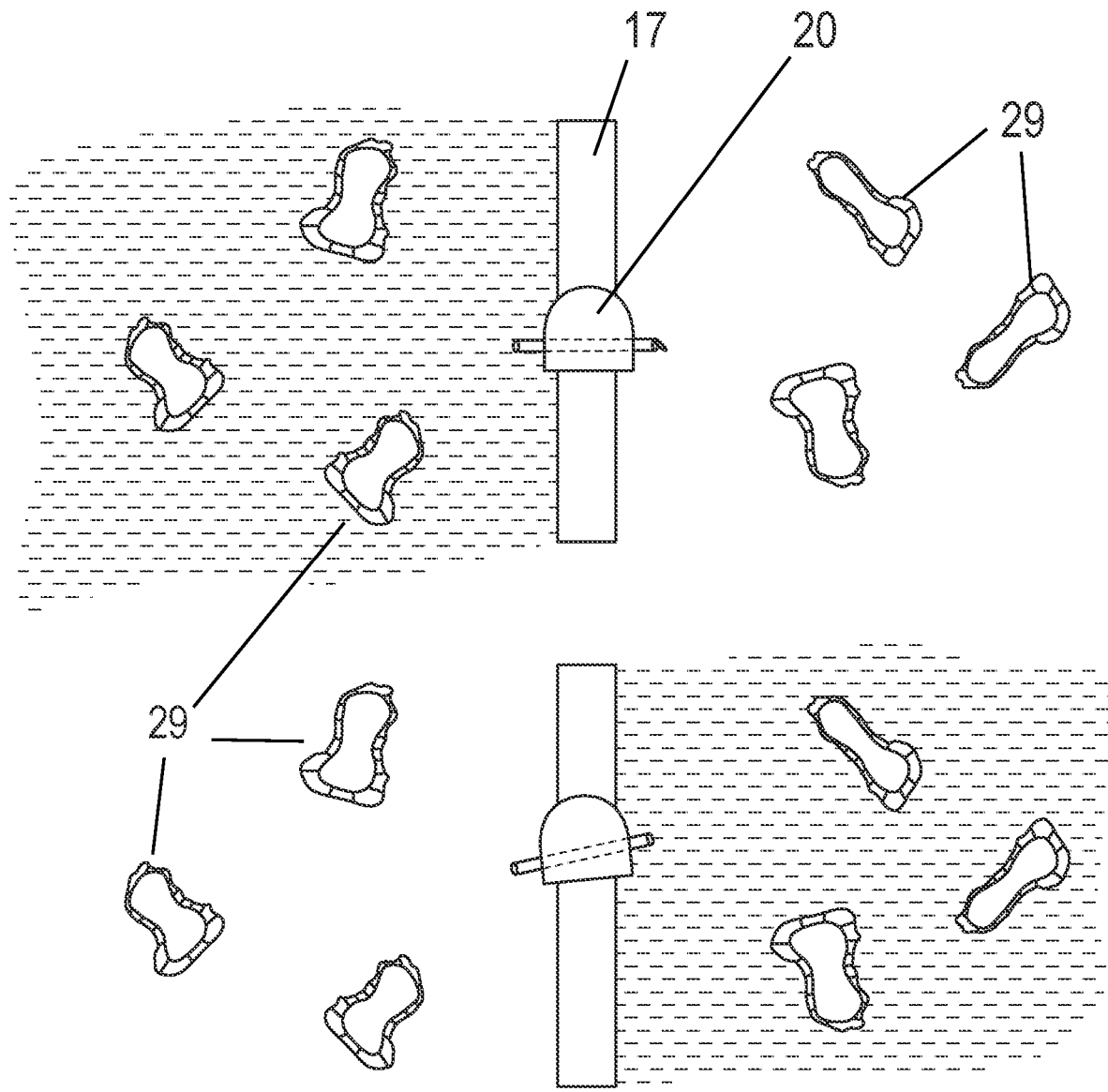
FIG. 11 is a top view of the concept illustrated in FIG. 12 showing how the mangrove forest made possible by the staggered pumping and drainage of water provides a barrier to coyotes and other land animals who would eat the birds, their young and their eggs.

FIG. 11 is a top view of the concept illustrated in FIG. 12 showing how the mangrove forest made possible by the staggered pumping and drainage of water by a series of pumps and drains on top of the berm 17 provides a barrier to coyotes and other land animals who would eat the birds, their young and their eggs on nesting islands 29.

In this "holding pond" embodiment of the invention showing the playa covered by a thin sheet of water after the pump has taken water from the Salton Sea, exposing "intertidal zones" on either side of the berm. This figure also shows the possible range for mangrove trees 21, which require periodic covering and uncovering by tidal action to survive.

FIGS. 10 and 11 also illustrate how mangrove habitat protects the nesting islands 29. Mangrove trees, when established, form a tangle of aerial roots that are virtually impenetrable for land animals the size of coyotes or bobcats, which are the main land-based predators of birds. The mangroves will also shade the ground surface, preventing it from drying out. This will only mitigate the dust clouds that often form during windy days, but also create a muddy surface that will cannot be used by land-based predators of birds. Because the invention creates a wide intertidal zone both above and below the berm, the mangrove forest will protect nesting areas created on both sides of the berm.

It is contemplated that both parts of the invention—creating a tidal range through staggered import and export of sea water from the entire body of the Salton Sea, and creating secondary tidal ranges through the use of berms—could be combined to create an ever larger tidelands. This, in turn, would create an even larger portion of the Salton Sea that could be used for mangrove trees.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Input
2. Output
3. Intermediate Lake
4. Input pump station
5. Output pump station
6. Salton Sea
7. Pacific Ocean
8. Input Secondary Pump station
9. Colorado River
10. Sea of Cortez
11. Input water
12. Elevated supports
13. Plume
14. Level of Salton Sea
15. Aeration
16. Playa
17. Berm
18. Solar panel
19. Pump
20. Drain
21. Mangrove
22. Current edge of playa
23. Pipeline
24. Top 3" of playa
25. Holding ponds
26. Access paths/roads
27. Marina
28. Ecohotel
29. Nesting Island That which is claimed:

1. A method for restoring water quality in a terminal, comprising: the use of an input pump station, an output pump station, an input conduit, an output conduit, a programmable timer, and an electrical connection, where the electrical connection connects the programmable timer, the input pump station and the output pump station, where the input pump station delivers a quantity of high level water from a saltwater source to a terminal lake, and where the output pump station removes a quantity of low level water from the terminal lake, and where the programmable timer staggers an input-on period for the input pump station with an output-on period for the output pump station such that a water level in the terminal lake rises to create an artificial high tide and falls to create an artificial low tide through the coordination of the input-on period and the output-on period by the programmable timer, additionally comprising a holding lake, where the holding lake receives a first quantity of water from a coastal input pump station, and stores the first quantity of water until receiving a release signal, at which point the holding lake releases a second quantity of water, where the second quantity of water flows into the terminal lake, additionally comprising a berm, a pump with a pipeline and a spigot, a drain, a programmable controller, and a solar array, where the terminal lake has a current shoreline and a playa, where the berm is located at a current water level of the terminal lake, where the berm creates a holding pond behind the berm, where an uppermost section of the playa has a playa elevation above the current shoreline, and the berm has a berm height, and the berm height is greater than the playa elevation, such that when a filling quantity of water is pumped into the holding pond, the playa will be covered by the filling quantity of water before the filling quantity of water overflows the berm, where the pump and the drain are controlled by the programmable controller to have an operational status or a non-operational status, where the pipeline extends from the pump into a deep region of the terminal lake, and when the pump is in the operational status, a deep quantity of water is removed from the terminal lake and driven by pump into the holding pond, where the deep quantity of water will cover the playa and create an artificial high tide, and where as the deep quantity of water is removed from the terminal lake, a tideland will be created in the terminal lake, there the tideland will be exposed directly to air when the holding pond is full of water, where the programmable controller can create a low tide by changing the pump to the non-operational status and changing the drain to the operational status.

2. The method of claim 1, where the spigot is located at least three feet above the playa elevation, such that when the deep quantity of water is driven into the holding pond, a fall of the deep quantity of water will creation a holding pond aeration of the deep quantity of water.

3. The method of claim 2, where there are more than one holding ponds and the more than one holding ponds are created by a network of spur berms radiating out from the shoreline of the terminal lake.

4. The method of claim 3, where at least one of the spur beams is wide enough to accommodate two persons and one bicycle, where at least one of the spur beams is wide enough to accommodate a vehicle, additionally comprising a structure on a spur extension, where the spur connection connects the berm to the structure.

5. A method for restoring water quality in a terminal lake, comprising: the use of an input pump station, an output pump station, an input conduit, an output conduit, a programmable timer, and an electrical connection, where the electrical connection connects the programmable timer, the input pump station and the output pump station, where the input pump station delivers a quantity of high level water from a saltwater source to a terminal lake, and where the output pump station removes a quantity of low level water from the terminal lake, and where the programmable timer staggers an input-on period for the input pump station with an output-on period for the output pump station such that a water level in the terminal lake rises to create an artificial high tide and falls to create an artificial low tide through the coordination of the input-on period and the output-on period by the programmable timer, where the high tide and the low tide combine to create a tideland, additionally comprising a berm, a pump with a pipeline and a spigot, a drain, a programmable controller, and a solar array, where the terminal lake has a current shoreline and a playa, where the berm is located at a current water level of the terminal lake, where the berm creates a holding pond behind the berm, where an uppermost section of the playa has a playa elevation above the current shoreline, and the berm has a berm height, and the berm height is greater than the playa elevation, such that when a filling quantity of water is pumped into the holding pond, the playa will be covered by the filling quantity of water before the filling quantity of water overflows the berm, where the pump and the drain are controlled by the programmable controller to have an operational status or a non-operational status, where the pipeline extends from the pump into a deep region of the terminal lake, and when the pump is in the operational status, a deep quantity of water is removed from the terminal lake and driven by pump into the holding pond, where the deep quantity of water will cover the playa and create an artificial high tide, and where as the deep quantity of water is removed from the terminal lake, a tideland will be created in the terminal lake, there the tideland will be exposed directly to air when the holding pond is full of water.

6. The method of claim 5, additionally comprising a holding lake, where the holding lake receives a first quantity of water from a coastal input pump station, and stores the first quantity of water until receiving a release signal, at which point the holding lake releases a second quantity of water, where the second quantity of water flows into the terminal lake.

7. The method of claim 6, additionally comprising an inland input pump station, where the inland input pump station is located between the holding lake and the Salton Sea, and where the inland input pump station discharges the second quantity of water from the holding lake to the terminal lake.

8. The method of claim 7, where the output pump station directs water to a sink, where the sink is selected from the group consisting of a river, sea or ocean.

9. The method of claim 5, where a high tide period and a low tide period create a tideland, where one or more species of mangrove trees are planted in the tidelands.

10. The method of claim 9, where the one or more species of mangroves are selected from the group consisting of *Rhizophora mangle, Avicennia germinans, Laguncularia racemose*, and *Conocarpus eretus*.

11. The method of claim 5, additionally comprising an outlet trough, where the outlet trough is an artificial river bed connecting an edge of the terminal lake to another body of water, where the outlet trough has a wet status when an outlet quantity of water is flowing down the outlet trough when the output pump station is in an operational mode, where the wet status is defined as a time period when water is flowing down the outlet trough, and where the outlet trough will have a dry status during times with the output pump station is in a non-operational mode, where the dry status is defined as having no water in the outlet trough, such that the outlet trough will simulate a tidal cycle such that mangroves can grow in the outlet trough.

12. The device of claim 5, where the programmable controller can create a low tide by changing the pump to a non-operational status and changing the drain to an operational status.

13. The device of claim 12, where the spigot is located at least three feet above the playa elevation, such that when the deep quantity of water is driven into the holding pond, a fall of the deep quantity of water will creation a holding pond aeration of the deep quantity of water.

14. The device of claim 13, where there are more than one holding pond and the more than one holding pond are created by a network of spur berms radiating out from the shoreline of a terminal lake.

15. The device of claim 14, where at least one of the spur beams is wide enough to accommodate two persons and one bicycle, where at least one of the spur beams is wide enough to accommodate a vehicle, additionally comprising a structure on a spur extension, where the spur connection connects the berm to the structure, where the structure is selected from the group comprising hotels, observation platforms, nature centers, environmental group headquarters, movie theatres, houses, apartments, marinas, camping areas, yacht buoys and campgrounds, where at least one of the structures is a floating structure.

16. A method for restoring water quality in a terminal lake, comprising a sea to sea portion and a holding pond portion, where the sea to sea portion comprises: an input pump station, an output pump station, an input conduit, an output conduit, a programmable timer, and an electrical connection, where the electrical connection connects the programmable timer, the input pump station and the output pump station, where the input pump station delivers a quantity of high level water from a saltwater source, to a terminal lake, such as the Salton Sea, and where the output pump station removes a quantity of low level water from the terminal lake, and where the programmable timer staggers an input-on period for the input pump station with an output-on period for the output pump station such that a water level in the terminal lake rises to create an artificial high tide and falls to create an artificial low tide through the coordination of the input-on period and the output-on period by the programmable timer, where the holding pond portion comprises: a berm, a pump with a pipeline and a spigot, a drain, a programmable controller, and a solar array, where the terminal lake has a current shoreline and a playa, where the berm is located at a current water level of the terminal lake, where the berm creates a holding pond behind the berm, where an uppermost section of the playa has a playa elevation above the current shoreline, and the berm has a berm height, and the berm height is greater than the playa elevation, such that when a filling quantity of water is pumped into the holding pond, the playa will be covered by the filling quantity of water before the filling quantity of water overflows the berm, where the pump and the drain are controlled by the programmable controller to have an operational status or a non-operational status, where the pipeline extends from the pump into a deep region of the terminal lake, and when the pump is in the operational status, a deep quantity of water is removed from the terminal lake and driven by pump into the holding pond, where the deep quantity of water will cover the playa and create a high tide, and where as the deep quantity of water is removed from the terminal lake, a tideland will be created in the terminal lake, there the tideland will be exposed directly to air when the holding pond is full of water, where a high tide period and a low tide period create a tidelands, where one or more species of mangrove trees can be planted in the tidelands, and where the programmable controller can create a low tide by changing the pump to a non-operational status and changing the drain to an operational status, thereby increasing the size of the tidelands, where the spigot is located at least three feet above the playa elevation, such that when the deep quantity of water is driven into the holding pond, a fall of the deep quantity of water will creation a holding pond aeration of the deep quantity of water, where the drain additionally comprises a drain pump, where the drain pump accelerates the flow of a quantity of holding tank water and sprays it into the air, thereby creation aeration of quantity of holding tank water, where there are more than one holding pond, where the more than holding pond is created by an access path from the shoreline of the terminal lake to the berm, additionally comprising a plurality of sea islands and a plurality of holding pond islands, where the sea islands are located on the terminal lake side of the berm, and the holding pond islands are located on the shore side of the berm.

17. The method of claim 16, where the plurality of sea islands and the plurality of holding pond islands have a height, and the height is greater than the height of the berm, such the a top of both the sea islands and the holding pond islands remain above the water level of the Salton Sea and the holding ponds at all times, where the one or more species of mangroves are selected from the group consisting of *Rhizophora mangle, Avicennia germinans, Laguncularia racemose*, and *Conocarpus erectus*.

* * * * *